United States Patent [19]

Guerin

[11] Patent Number: 4,706,199
[45] Date of Patent: Nov. 10, 1987

[54] MOVING MAP DISPLAY PROVIDING VARIOUS SHADED REGIONS PER ALTITUDE FOR AIRCRAFT NAVIGATION

[75] Inventor: Stanislas P. Guerin, Paris, France

[73] Assignee: Thomson-CSF, Paris, France

[21] Appl. No.: 654,883

[22] Filed: Sep. 27, 1984

[30] Foreign Application Priority Data

Sep. 30, 1983 [FR] France .................................. 83 15656

[51] Int. Cl.$^4$ ........................ G09B 29/12; G06G 7/78; G01C 15/00
[52] U.S. Cl. ..................................... 364/460; 340/703; 364/449; 342/181; 342/191; 342/462
[58] Field of Search ............... 364/460, 443, 449, 521; 358/54, 214; 343/5 CD, 5 MM, 462, 455; 340/715, 729, 703, 723, 988, 995

[56] References Cited

U.S. PATENT DOCUMENTS

| | | | |
|---|---|---|---|
| 3,213,447 | 10/1965 | Burrows et al. | 343/7 |
| 3,737,120 | 6/1973 | Green | 244/3.17 |
| 3,739,369 | 6/1973 | Bunker et al. | 340/324 A |
| 4,200,866 | 4/1980 | Strathman | 340/703 |
| 4,225,861 | 9/1980 | Langdon, Jr. et al. | 340/703 |
| 4,352,105 | 9/1982 | Harney | 343/5 CD |
| 4,462,042 | 4/1984 | Reymond et al. | 358/79 |
| 4,494,201 | 1/1985 | Reymond et al. | 364/449 |
| 4,514,733 | 4/1985 | Schmidtlein et al. | 343/5 MM |

FOREIGN PATENT DOCUMENTS

2043388 10/1980 United Kingdom .

OTHER PUBLICATIONS

Gray et al., "Real-Time Color Doppler Radar Display", Bull. Am. Meteoroligical Society, vol. 56, No. 6, Jun. 1975, pp. 580–588.

*Primary Examiner*—Felix D. Gruber
*Assistant Examiner*—Daniel W. Juffernbruch
*Attorney, Agent, or Firm*—Oblon, Fisher, Spivak, McClelland, & Maier

[57] ABSTRACT

The moving map display screen makes it possible to display the relief of the area overflown by an aircraft as a function of the altitude of the latter.

A moving-spot video reader analyses by radial scanning the relief of the area to be overflown and recorded on a film. In a processing circuit, the instantaneous altitude of the analyzed point is supplied in digital form to three comparators, where it is compared to three different values as a function of the aircraft altimeter. The result of this comparison makes it possible to classify this altitude in a range relative to the instantaneous altitude of the aircraft. A transcoder allocates to each range a particular digital value corresponding to a given shade. A display means reproduces the relief of the analyzed area with the aid of several conventional shades.

17 Claims, 6 Drawing Figures

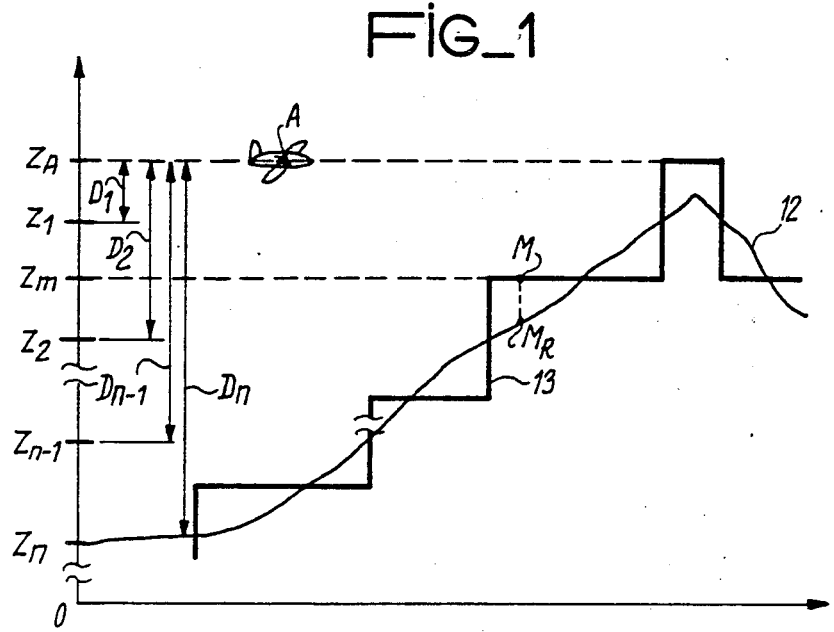
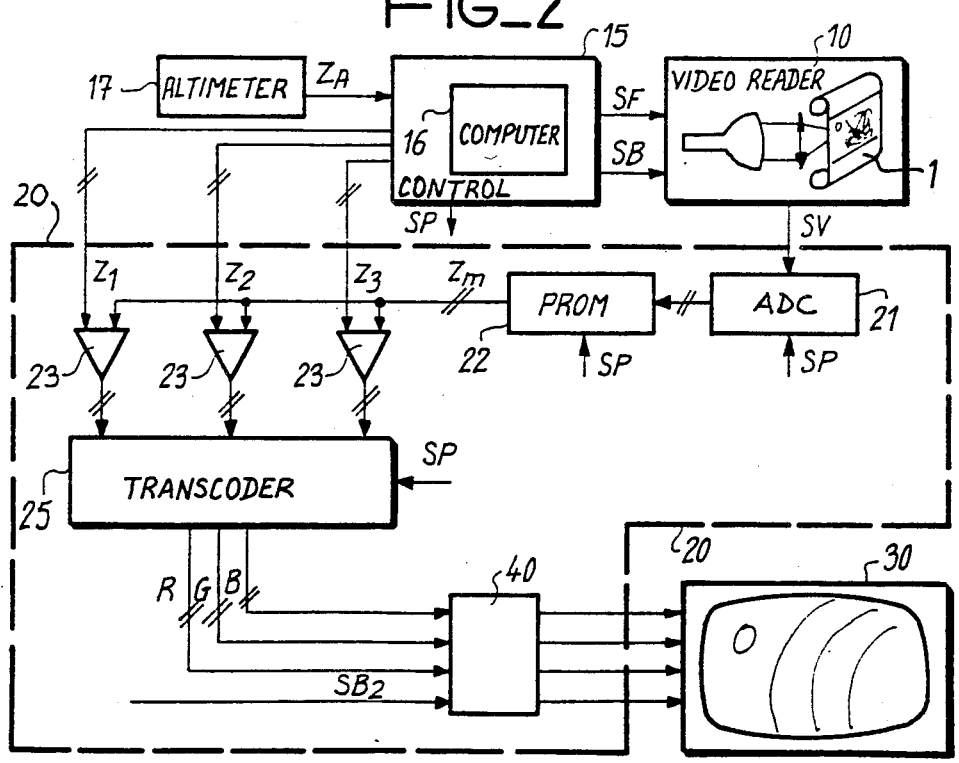

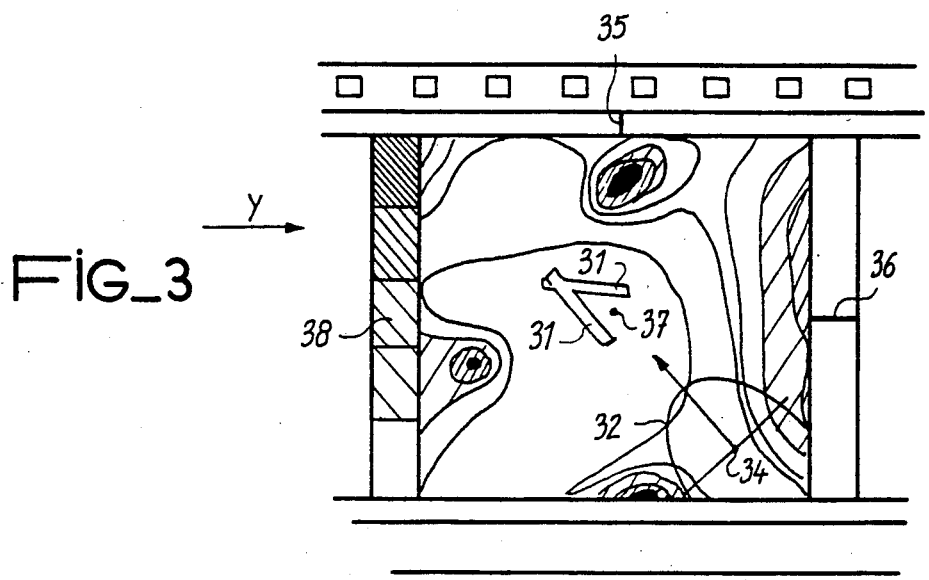
FIG_3
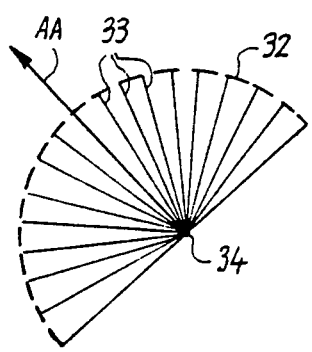
FIG_4
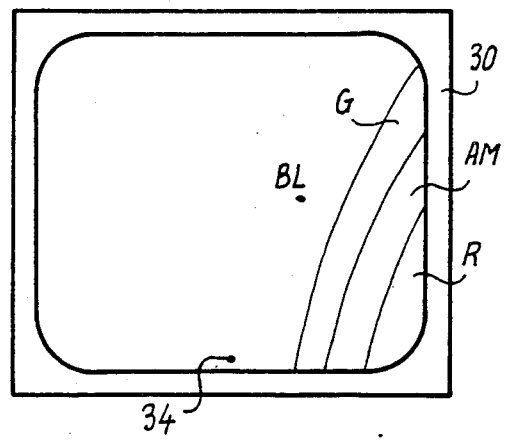
FIG_5

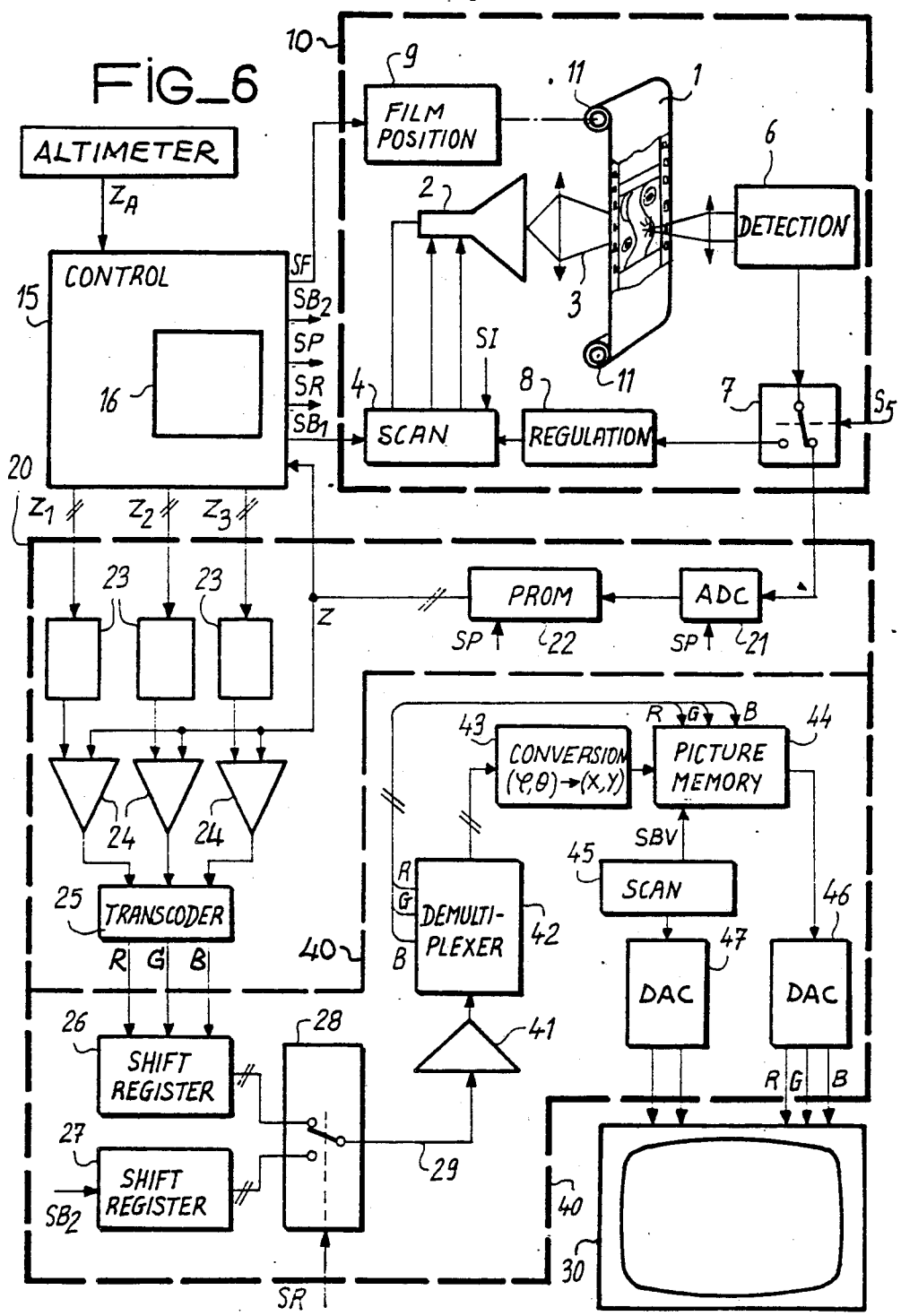
FIG_6

MOVING MAP DISPLAY PROVIDING VARIOUS SHADED REGIONS PER ALTITUDE FOR AIRCRAFT NAVIGATION

BACKGROUND OF THE INVENTION

1. Field of the invention

The invention relates to a moving map display making it possible to achieve a ground advisory and collision avoidance system. This display means analyses the relief around the aircraft and which is recorded on film and shows this relief on a cathode display in a manner suitable for direct use by the crew.

These moving map displays make it possible to display a moving geographical map on board a vehicle and are more particularly used for aircraft navigation. In this concept, the map picture displayed on a cathode screen frequently shows the overflown area. To this map are generally added symbols and inscriptions relating to navigation parameters and to the aircraft position. The displayed picture must move in the same way as the ground below the aircraft and its position must be consequently dependent on X, Y and $\theta$, respectively corresponding to the longitude, latitude and heading data of the aircraft, said data being supplied by the aircraft navigation system. The moving map display incorporates a computer which, on the basis of said data, processes control signals controlling the position of the picture in X, Y and $\theta$.

2. DESCRIPTION OF THE PRIOR ART

U.S. Pat. No. 4,138,726 discloses a moving map display comprising the map recorded on a photographic film supported by spools, a video picture reader on the basis of a line-by-line scan, means for the dependence control of the picture as a function of the latitude, longitude and heading and circuits for displaying the video reading signals. The video reader comprises either a light source and a television camera, or a flying-spot scanning tube and a photodetector (photomultiplier or the like) optical image transfer and focusing elements and a generator of the scan signals of the camera or a flying-spot tube. In the case of a color film it is necessary to add a trichromatic optical separator and three photodetectors or cameras in place of one element.

Processing circuits for the video reading signals can be used for different purposes prior to the monochromatic or color cathode display. French Pat. No. 2 463 392 describes such a construction for a selection of colors or a color code conversion, whilst French Pat. No. 2 499 743 describes a construction making it possible to restore the three color components from a black and white film or two color components. Each of these, processing makes use of a programmed read-only memory (PROM) for brining about the correspondence between the input value or analyzed point and an output, code-converted value for the display in accordance with a predetermined table.

French Pat. No. 83 01068 of 25.1.1983 deals with a structure of this type, in which the film is an altitude survey and the memory makes it possible to restore the altitude value of the analyzed point. The survey is recorded on film in the form of a plurality of shades corresponding to different altitude sections. Following the reading on the film of the shades of the successive points of the path followed, it is necessary to make the corresponding amplitude correspond with each of them and this is then displayed on the cathode screen. This gives a curve of the altitude variations for a given section of the ground or terrain. Several simultaneously displayed curves and corresponding to parallel sectional planes of different distances can give the user a glimpse of the ground over which he is to fly. This patent also takes account of the instantaneous altitude of the aircraft in order to make said display more real, but does not take account of the altitude difference between the aircraft and the point on the ground over which it is flying. However, the latter information is very useful in the case of poor visibility conditions and may be able to prevent collisions with the ground.

The purpose of the invention is to develop such a display means so that it obviates these disadvantages and precisely displays the distance of the relief of the overflown area as a function of the altitude of the aircraft.

An object of the invention is to use an altitude survey of an area to be overflown, effect the video reading thereof, compare the successive altitude values read with the instantaneous value of the aircraft and color-display the result by a conventional representation.

SUMMARY OF THE INVENTION

The invention proposes a display means for the data recorded on a photographic film and corresponding to altitude surveys coded in accordance with a plurality of predetermined shades in order to cover a total amplitude range with a desired precision, having a device for the point-by-point analysis of the film supplying video signals, a processing circuit for decoding these signals in real time by identifying the shade of each point and by making its altitude correspond thereto, a cathode display means for the processed signals, and control means for processing the different synchronization and control signals and receiving from an auxiliary altimeter the altitude information of the display means, wherein the control means process a plurality of n values which are smaller than the altitude of the means, breaking down said altitudes into n+1 regions, each of which has a predetermined width, said processing circuit also having a plurality of n threshold comparators for comparing the altitude of the point analyzed with the said n values constituting the respective thresholds and determining in which region the said point is located, a transcoder which receives the comparison result and makes a separate color information used for display purposes correspond with each of said regions.

DESCRIPTION OF THE DRAWINGS

The invention is described in greater detail hereinafter relative to non-limitative embodiments and with reference to the attached drawings, wherein show:

FIG. 1 a diagram relating to the principle used in the display means according to the invention. FIG. 2 a diagram of an embodiment of the display means according to the invention.

FIG. 3 a diagram relation to the reading scan carried out on the film.

FIG. 4 a detail reating to the reading scan of FIG. 3.

FIG. 5 a displayed picture corresponding to the scan of FIG. 3.

FIG. 6 a detailed diagram of a preferred embodiment of the display means according to the invention.

DESCRIPTION OF THE PREFERRED EMBODIMENT

The description of the moving map display according to the invention is given hereinafter witin the scope of a usage more particularly intended for aircraft navigation. The means is installed on board an aircraft, together with other instruments and equipment, such as the altimeter, flight computer, etc.

FIG. 1 gives an easier understanding of the principle of the invention. An aircraft A overflies an area at an altitude $Z_A$. Curve 12 represents the real altitude variation of the ground along the path of the aircraft. The stepped curve 13 represents the variations of the values read by a video reader on an altitude survey of the overflown area along the same path. The steps correspond to the different altitude sections of the coding of the film. Film point M corresponds to the real point $M_R$ on the ground and the corresponding altitude read on the film $Z_M$ on axis OZ gives different altitudes $Z_1, Z_2 \ldots Z_n$, which compared with $Z_A$ are at different distances $D_1, D_2 \ldots D_n$ from the aircraft. For airborne use, these altitudes can e.g. be defined in the following way:

$Z_1 = Z - 30$ meters
$Z_2 = Z - 90$ meters
$Z_3 = Z - 150$ meters

These correspond to three distances of 30, 90 or 150 meters. These three values define four altitude ranges of given width namely altitudes below $Z_1$, altitudes between $Z_1$ and $Z_2$, altitudes between $Z_2$ and $Z_3$ and altitudes greater than $Z_3$. A display shade or color, e.g. black, green amber and red is associated with each of these four altitude ranges.

The use of a color film making it possible to have a large number of shades is not necessary and is very onerous. Therefore, the moving map display uses a monochromatic, black and white photographic film 1, on which are recorded topographical data. Each photograph on the film is constituted by a precise altitutde survey of a region. The altitudes are stored in accordance with different grey levels, predetermined relative to the different altitude sections to be translated. Each altitude section, corresponding to a step in FIG. 1, is allocated to a given density value of the film, i.e. to a certain grey level in a range preferably extending from black to white. This region is preferably the territory portion whose overflying is dangerous at certain points, particularly an airport having a difficult access.

On referring to FIG. 2, the display essentially has a video reader 10 of film 1, control means 15, a processing circuit 20 and a cathode display 30. The operation of the video reader will be briefly described hereinafter.

A video signal SV is supplied by the video reader 1 and is applied to the input of the processing circuit in an analog—digital converter 21. By means of the programmable read-only memory 22, a corresponding digital altitude value $Z_M$ is associated with each of the analyzed values.

According to the invention, said value $Z_M$ is applied to the input of a number n of comparators 23 with digital inputs and outputs. The n comparators define n+1 altitude ranges. The different threshold values corresponding to the levels $Z_1, Z_2, \ldots Z_n$ are calculated by a computer 16 forming part of the control means, as a function of the instantaneous altitude $Z_A$ of the aircraft supplied by an auxiliary altimeter 17.

The result of each of these comparisons is given in digital form and is transmitted to a transcoder 25. The combination of the n results only applies to the relative altitude range defined with respect to the aircraft in which the analyzed point is located at this precise time. The transcoder makes the display shade characteristic of the relative altitude range of the considered point correspond to each combination. The corresponding digital outputs translate the three chromatic components red R, green G and blue B for each of these shades and are transmitted across an output circuit 40 before being applied to a color cathode display means.

As is commonly known, the color display means include three color tubes or generators, one for each of the colors red, green and blue. Thus, each of the signals from transcoder 25 is utilized to drive one of these tubes. The output of the transcoder is formed by these digitial outputs which may be used to form a separate combination, corresponding to eight different display colors.

The output circuit can also supply scan signals to the display means 30 on the basis of display scan control signals $SB_2$ processed by the control means 15. This circuit will be described in greater detail hereinafter within the scope of a preferred embodiment.

The control means 15 process the different control and synchronizing signals necessary for the operation of the system. These signals comprise the reading scan control signals $SB_1$ applied to the video reader 10 and $SB_2$ applied to the output circuit 40, a signal SP relating to the point-by-point synchronization of the analyzed values and film positioning control signals SF.

The photograph shown in FIG. 3 is, for example, an altitude survey of an area around an airport indicated by the two runways 31, whose approach is difficult or dangerous for an aircraft. It is possible to see level curves defining the different grey levels relating to altitude sections. The scan of the video reader 10, illustrated in greater detail in FIG. 4, is of the radial type limited to a sector, e.g. a half-circle 32, with a given number of radials 33. The scan center 34 represents the instantaneous position of the aircraft. The scanning orientation is dependent on the longitudinal axis AA of the aircraft or some other reference, such as its heading or the route to be followed.

FIG. 5 shows the image seen on the screen of the display means 30 relative to the scan performed in FIG. 3, i.e. the four zones shown are directly related to those shown by scan 32. For example, red is used to display all those parts R of the zone, whose altitude exceeds the altitude of the aircraft, less 30 meters, overflying of said zones being forbidden. The zones AM, whose altitudes are between 30 and 90 meters below the aircraft are displayed in amber, overflying of said zones being guaranteed but forbidden. Between 90 and 150 meters below the aircraft, the zones G are displayed in green and their overflying is not advised. Finally, beyond 150 meters below the aircraft, the zones BL appear in black and can be overflown.

On referring to FIG. 6, the video reader 10 essentially comprises for the purpose of analyzing film 1, a flying-spot tube 2 and scanning and supply circuits 4. The video reader also comprises a photodetector 6, which supplies a video signal SV. A switch 7 controlled by an image synchronization means SI makes it possible to connect a control loop 8 of the intensity of the light source constituted by the spot of tube 2. A control circuit 9 controlled by the signals SF permits the approximate vertical positioning of the film 1 supported by spools 11.

Two marks 35 and 36 are respectively placed on two longitudinal edges of picture (FIG. 3). thus, like the control means 15 and scanning and supply circuits 4, they are used for the precise positioning of the spot on the film. The sizes or dimensions of the two marks correspond to the coordinates of a particular point 37 on the picture. A precise positioning of the spot represents a precise identification (±10 micrometers) of the position of the film and which is carried out in the following way.

Prior to the reading of an image of the film to be produced, the programming of the computer provides for a slow speed scan of the two edges of the picture carrying the marks 35 and 36. The latter are also characterized by a special shade different from that used in the picture, a high sharpness and excellent contrast. Moreover, the output of the PROM 22 is connected to a control means. When one of the marks is scanned, the computer identifies the value specific to the shade of the mark. Knowing the origin and scanning rate, the computer evaluates the scan time up to the mark and deduces therefrom the precise size of the latter. When the two marks have been scanned, the computer knows the precise position of the point 37 on the picture. The computer memory stores the latitude and longitude of the real point corresponding to point 37 and defined by the mark of the picture in question and its scale. Computer 16 then compares the latitude and longitude coordinates measured at the real values of the particular point which are stored beforehand. These real values and the heading are transferred by auxiliary equipment to the control means, which then process the reading scan signals SB$_1$ as a function of the longitude and latitude coordinates and the measured distances. The aircraft latitude and longitude are known at all times, the aircraft point being systematically positioned relative to the picture to be scanned. There is no displacement of the film and this obviates the need for a precise mechanical control system.

Along another edge of each picture, a calibration strip 38 formed by successive areas respectively corresponding to the different shades used on the picture, makes it possible to regulate the intensity of the spot of tube 2. Before analyzing the film, the programming of control means 15 also provides for the scanning of this zone, in order to calibrate the intensity of the spot by means of control loop 7-8.

In the preferred embodiment of FIG. 6, the reading scan is a centrifugal radial and the picture scanning cycle is very considerable (approximately 1 second) in order to obtain a very accurate result.

Moreover, the display requires a picture frequency of approximately 25 to 30 pictures per second and a picture representation according to a radial scan causes brightness problems (high luminance in the center of the scan and low luminance at the ends of the radials). Therefore a vertical, line-by-line scan is used.

Moreover, in order to give the invention the widest possible application, preferably the video output 29 is in accordance with the meteorological radar standard SAI ARINC 708.

A reading scanning mode which is also in accordance with the meteorological radar scan described in the aforementioned standard is also adopted. This is the centrifugal scan covering 1500 radials of 512 points each, the field covered being 180° and has been described hereinbefore relative to FIG. 4.

On returning to FIG. 6, the digital output of transcoder 25 may only have e.g. three bits, in order to be able to form eight separate combinations, corresponding to eight different display colors. Each transcoded combination is transferred in parallel by a shift register 26 whose reading takes place in series. A second shift register 27 stores the data SB$_2$ necessary for display scanning. In the case of the aforementioned standard, these data are the order number of the radial scanned for a picture, take-over data, the scale of the scan, the scan angle and a radial synchronization. The output of each of these two registers is connected to a selector 28 controlled by a radial synchronization SR processed by the control means 15 and which, by multiplexing, makes it possible for a bus 29 to successively carry during the line returns of the scan the identification informations for the radials and during the line scan the values coded on three bits of the points of the radial.

The output circuit is used for the display of a meteorological radar essentially comprising an amplifier 41, a demultiplexer 42, an operator circuit 43 for converting polar coordinates into cartesian coordinates, a picture memory 44, a vertical line-by-line scan generator 45 and digital—analog converters 46, 47. The demultiplexer orients the data relating to the synchronization and the data relating to the radials towards the conversion operator circuit 43, whose outputs are applied tot he addressing inputs of the picture memory. The successive information of colors R, G, B of each of the points of the radial are applied by the demultiplexer to the data inputs of the picture memory. The display scan synchronization SBV is used for reading the picture memory 44. Therefore each point of the same picture can remain in this memory and can be displayed at all times during a writing cycle, which lasts one or several seconds, while waiting for the corresponding point of the following picture to be analyzed and stored. The memory is progressively modified, but its content is read with the timing of the display scan synchronization SBV.

The length of the radials 33 can be chosen from among several values, e.g. 15, 30 and 60 nautical miles. The transcoder 25 can be realized by a programmable read-only memory.

The number of display colors is not limted to four and in the same way the altitude sections are not limited to the three values considered in exemplified manner. The use of a color film is also envisaged so that, if appropriate, it is possible to store a large number of values which could not be stored on a black and white film. In this case use is made of a trichromatic separator and three photodetectors for supplying three video signals to the processing circuit and there are three switches 7. There is an analog—digital converter for each of the signals.

What is claimed is:

1. A moving map display for use in an aircraft based on data recorded on a photographic film having a series of pictures, said data corresponding to altitude surveys coded in accordance with a plurality of predetermined shades and colors in order to cover a total altitude range with a desired precision, said display comprising:
   a point-by-point analysis device of the film supplying video signals;
   control means for receiving and processing different synchronization and control signals and receiving from an auxiliary altimeter, altitude information of the aircraft and for producing a plurality of n fixed altitude values, each of said n altitude values being smaller than said altitude of the aircraft and which subdivide the said altitude of the aircraft into n+1 regions, each having a predetermined height;

a processing circuit for decoding said video signals in real time by identifying the shade or color of each point on said map and determining from a table of values in memory based on said identified shade or color the altitude of said point corresponding thereto, a plurality of n comparators for comparing the altitude of said point with each of said n altitude values and determining in which region said point is located, a transcoder receiving the output of said comparators for producing color information used for display purposes corresponding to each of these regions; and means for cathode displaying said color information.

2. A moving map display according to claim 1, whereof the processing circuit has a first programmable read-only memory for bringing about the correspondence between the shade of each point and its altitude, wherein the comparators used are digital comparators and wherein the transcoder is a second programmable read-only memory.

3. A moving map display according to claim 1, whereof the analysis device is a cathoderay tube, wherein said tube uses a centrifugal radial scan comprising a given number of radials to scan said film, said scan being centered on a point of the film corresponding to the position of the display.

4. A moving map display according to claim 2, whereof the analysis device is a cathode-ray tube, whereof said tube uses a centrifugal radial scan comprising a given number of radials to scan said film, said scan being centered on a point of the film corresponding to the position of the display.

5. A moving map display according to claim 3, wherein the display means operates on the basis of a vertical line-by-line scan.

6. A moving map display according to claim 4, wherein the display means operates on the basis of a vertical line-by-line scan.

7. A moving map display according to claim 3, wherein the processing circuit comprises an output circuit having a first shift register receiving from the transcoder color information having a given number of bits, a second shift register receiving one of said synchronization and control signals from the control means and comprising digital radial identification information, a selector controlled by a radial synchronization processed by the control means and receiving on two input terminals respectively the two outputs of the said registers and supplying on a bus the digital information relative to one of said radials, followed by the color information relative to the different points of said radial, for processing said one of said synchronization and control signals and said color information signals for applying them to the display means.

8. A moving map display according to claim 5, wherein the processing circuit comprises an output circuit having a first shift register receiving from the transcoder color information having a given number of bits, a second shift register receiving one of said synchronization and control signals from the control means and comprising digital radial identification information, a selector controlled by a radial synchronization processed by the control means and receiving on two input terminals respectively the two outputs of the said registers and supplying on a bus the digital information relative to one of said radials, followed by the color information relative to the different points of said radial, for processing said one of said synchronization and control signals and said color information signals for applying them to the display means.

9. A moving map display according to claim 2, whereof the control means comprises a computer, wherein precise film positioning means are provided and are constituted by two marks on the perpendicular edges of each picture on the film, so as to determine the coordinates of a particular point of the picture, said computer controlling the scanning of said marks, said computer receiving the output of said first memory in order to receive information relative to the marks, said computer determining the exact position of said two marks in order to precisely adjust the scan with respect to said particular point.

10. A moving map display according to claim 1, used on board an aircraft for displaying the relief of the overflown ground or the ground to be overflown, as a function of the aircraft altitude, wherein each of the pictures of the film is an altitude survey of a region whose overflying is dangerous.

11. A moving map display according to claim 3, used on board an aircraft for displaying the relief of the overflown ground or the ground to be overflown, as a function of the aircraft altitude, wherein each of the pictures of the film is an altitude survey of a region whose overflying is dangerous.

12. A moving map display according to claim 5, used on board an aircraft for displaying the relief of the overflown ground or the ground to be overflown, as a function of the aircraft altitude, wherein each of the pictures of the film is an altitude survey of a region whose overflying is dangerous.

13. A moving map display according to claim 7, used on board an aircraft for displaying the relief of the overflown ground or the ground to be overflown, as a function of the aircraft altitude, wherein each of the pictures of the film is an altitude survey of a region whose overflying is dangerous.

14. A moving map display according to claim 8, used on board an aircraft for displaying the relief of the overflown ground or the ground to be overflown, as a function of the aircraft altitude, wherein each of the pictures of the film is an altitude survey of a region whose overflying is dangerous.

15. A moving map display according to claim 9, used on board an aircraft for displaying the relief of the overflown ground or the ground to be overflown, as a function of the aircraft altitude, wherein each of the pictures of the film is an altitude survey of a region whose overflying is dangerous.

16. A moving map display according to claim 10, wherein the overflown ground is an airport and the area surrounding it.

17. A moving map display according to claim 15, wherein the overflown ground is an airport and its surrounding area.

* * * * *